United States Patent [19]
Williams

[11] Patent Number: 5,671,915
[45] Date of Patent: Sep. 30, 1997

[54] LOCKING CAM WORKPIECE CLAMPING APPARATUS

[76] Inventor: Willis Ray Williams, 767 S. Fielder, Arlington, Tex. 76013

[21] Appl. No.: 514,126

[22] Filed: Aug. 11, 1995

[51] Int. Cl.$^6$ .................................................. B25B 5/08
[52] U.S. Cl. ........................... 269/231; 269/900; 403/315
[58] Field of Search ........................ 269/9, 104, 229, 269/231, 303, 900, 196, 197, 198, 199, 203, 204, 235, 309; 403/315, 316, 317, 318, 319, 320

[56] References Cited

U.S. PATENT DOCUMENTS

| | | | |
|---|---|---|---|
| 1,815,660 | 7/1931 | Walker | 403/315 |
| 2,182,240 | 12/1939 | Sinclair | 403/317 |
| 2,365,079 | 12/1944 | Huber | 269/165 |
| 2,447,889 | 8/1948 | Adler | 269/900 |
| 2,709,608 | 5/1955 | Smith | 403/319 |
| 3,862,808 | 1/1975 | Perini | 403/318 |
| 4,157,819 | 6/1979 | Meyer | 269/231 |
| 4,363,562 | 12/1982 | Hora | 403/318 |
| 4,632,593 | 12/1986 | Stashko | 403/316 |

FOREIGN PATENT DOCUMENTS 7012   4/1893   United Kingdom.

Primary Examiner—Robert C. Watson
Assistant Examiner—Thomas W. Lynch
Attorney, Agent, or Firm—Henderson & Sturm

[57] ABSTRACT

A workpiece clamping apparatus for securing a workpiece relative to a planar support surface has a first cam with an arcuate exterior surface thereon. A pin is disposed for rotationally mounting the first cam about an axis. A mounting member is associated with the planar support surface for receiving the pin. Additionally, an abutment plate is operatively associated with the first cam for releasable securing a workpiece relative to the planar support surface. The workpiece can also include a second cam, having an arcuate exterior surface operably attached to the pin. The mounting member has a plurality of spaced apertures arranged in rows on the planar support surface, wherein each of the apertures are dimensioned to receive the pin.

3 Claims, 3 Drawing Sheets

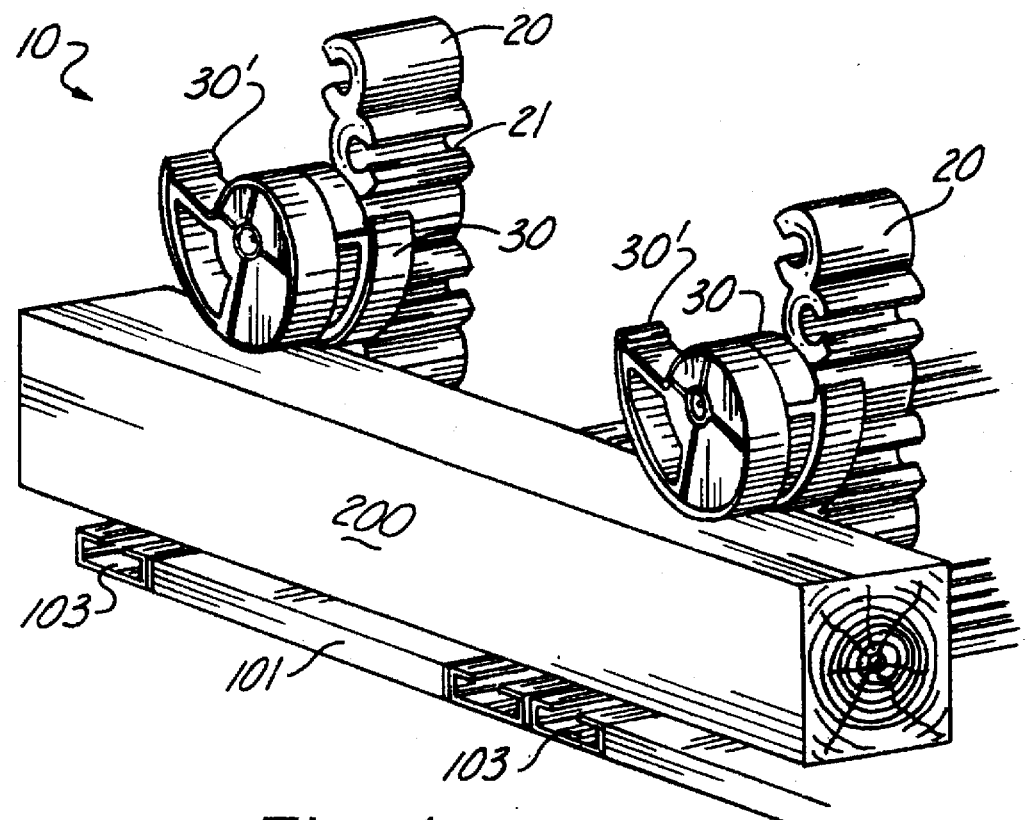
Fig. 1
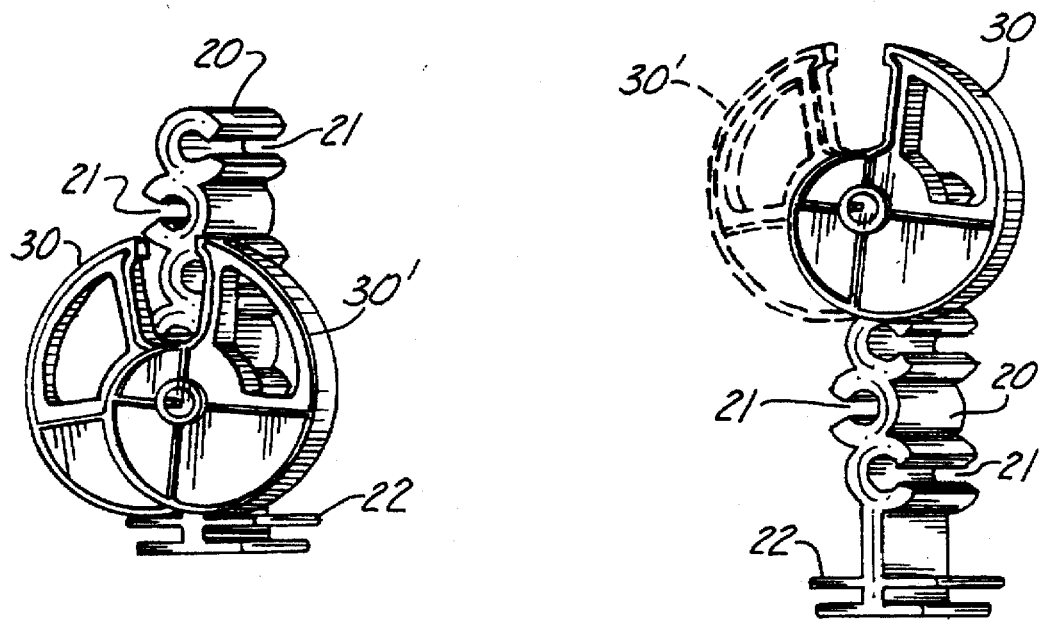
Fig. 2
Fig. 3

5,671,915

LOCKING CAM WORKPIECE CLAMPING APPARATUS

TECHNICAL FIELD

The present invention relates to clamping arrangements in general and in particular to a workpiece clamping apparatus for securing a workpiece to a planar support surface.

BACKGROUND ART

Up until the present time, both professional and amateur craftsmen have been frustrated by the failure of the industry to provide an economically priced worktable that offers both a stable work surface and/or platform that is specifically designed to accommodate a wide variety of power tools, clamps and accessories to allow the draftsmen to perform a variety of tasks on different workpieces.

With the impending introduction of the subject matter of co-pending patent application Ser. No. 08/245,286 filed May 16, 1994, and entitled Collapsible Workbench Apparatus, a part of the solution to the above stated problem will be in place.

This particular invention involves a new style, collapsible workbench whose work surface employs a novel combination of channel tracks and spaced apertures that not only lend themselves to the mounting of existing power tools but which have also spawned an entire family of workpiece clamping apparatus that can be employed both alone and in combination with one another to immobilize a workpiece relative to the newly designed work surface.

DISCLOSURE OF THE INVENTION

An object of the present invention is to provide a workpiece clamping apparatus that will securely position a workpiece relative to a planar support surface.

Another object of the present invention is to provide a workpiece clamping apparatus that can be accommodated on any work support surface provided with rows of apertures and/or a plurality of channel tracks to fixedly secure a workpiece relative to the work support surface.

A further object of the present invention is to provide a workpiece clamping apparatus that can be used either alone or in combination with other related workpiece clamping apparatus to secure various workpieces in a variety of different orientations, both relative to a work support surface and/or the different workpiece clamping apparatus.

Still another object of the present invention is to provide a family of workpiece clamping apparatus components that can be combined with other related components in a variety of ways to produce different clamping configurations.

Yet another object of the present invention is to provide a workpiece clamping apparatus that is economically priced, rugged in construction, simple to use, either by itself or in combination with other clamping arrangements, and which has a long useful life.

BRIEF DESCRIPTION OF THE DRAWINGS

FIG. 1 is a perspective view of the workpiece clamping apparatus that forms the basis of the present invention deployed in one mode of operation;

FIG. 2 is an isolated detail view of a double cam lock arrangement disposed on a vertical cam block;

FIG. 3 is a perspective view of a single cam lock deployed or disposed on a vertical cam lock;

BEST MODE FOR THE CARRYING OUT THE INVENTION

Figure 4:
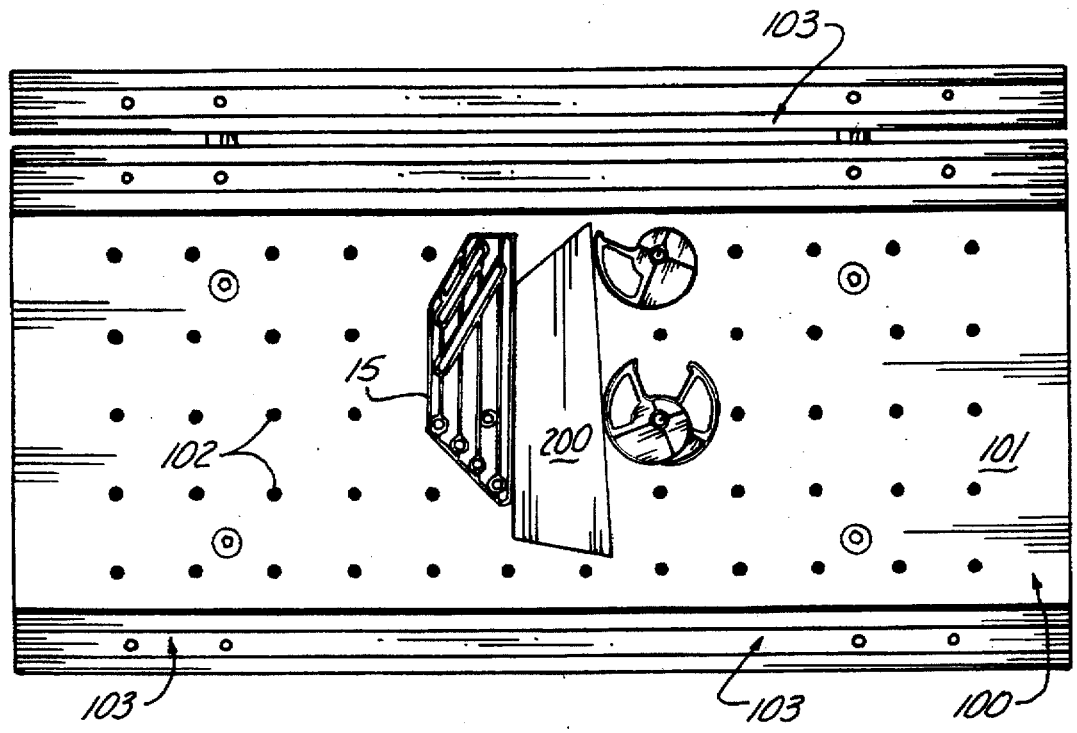
FIG. 4 is a top plan view of both a single and a double locking cam member or members disposed on a planar support surface.
Figure 5:
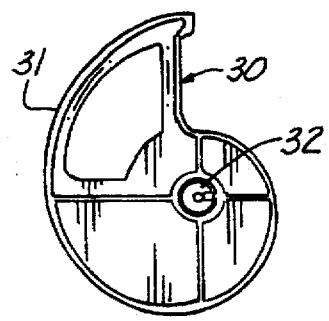
FIG. 5 is a top plan view of a single locking cam.
Figure 6:
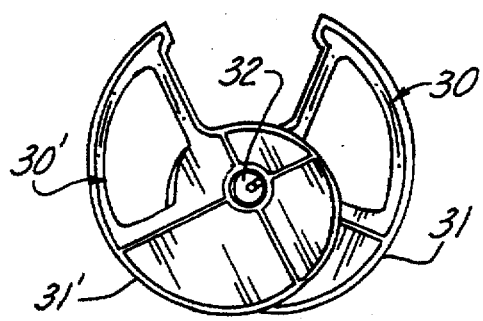
FIG. 6 is a top plan view of the double locking cam.
Figure 7:
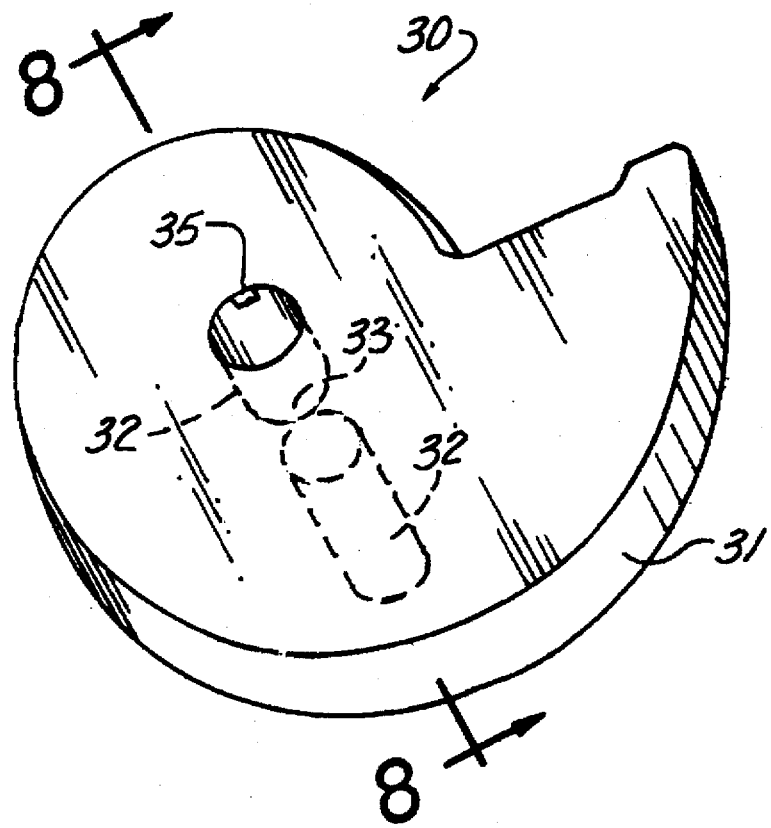
FIG. 7 is an perspective view of a single locking cam and its associated laterally translatable pin member.
Figure 8:
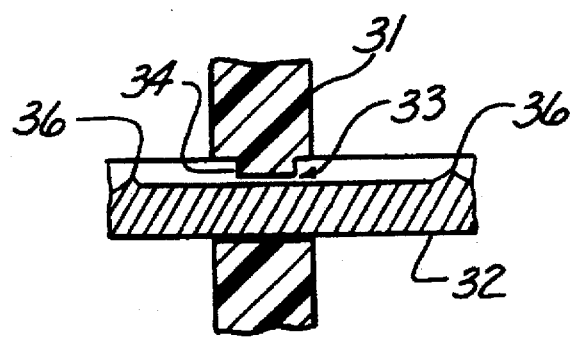
FIG. 8 is a cross-sectional view taken through line 8—8 of FIG. 7.

As can be seen by reference to the drawings and in particular to FIG. 1, the workpiece clamping apparatus that forms the basis of the present invention is designated generally by the reference numeral 10. Prior to embarking upon a detailed description of the workpiece clamping apparatus 10, it would be first advisable to describe the environment in which this invention is intended to be practiced.

As can be seen by reference to FIGS. 1 and 4, the clamping apparatus 10 is intended for use in conjunction with a generally planar work support surface 100 having a rigid support surface 101 provided with a plurality of apertures 102 wherein, the planar support surface 100 is further provided with a plurality of track channels 103.

In the first version of the preferred embodiment depicted in FIG. 1, a workpiece 200 is secured on top of the planar support surface 101 by a cam arrangement comprising a vertical cam block 20 and a locking cam arrangement which will be described presently.

The workpiece clamping apparatus 10 that forms the basis of the present invention comprises in general a vertical cam block 20 and a locking cam 30 having an arcuate surface 31 wherein the locking cam 30 is further provided with a pin member 32 which projects through an aperture 33 formed in the cam member 30.

As can best be seen by reference to FIGS. 5-8, the cam member 30 is further provided with a central aperture 33 wherein a downwardly projecting tang (shown in FIG. 8) extends partially into the aperture 33. The pin member 32 comprises a generally cylindrical pin element having a recess 35 formed therein, wherein a plurality of upwardly extending projections 36 are formed within the recess 35, thereby allowing the pin member 32 lateral translation relative to the cam member 30. In one version of the invention, a single cam member 30 is rotatably disposed on the pin member 32 and in another version of the invention a second cam member 30' having an arcuate surface 31' is similarly disposed on the pin member 32 wherein the respective arcuate surfaces 31 (31') are disposed in opposite directions.

Turning now to FIGS. 1-3 it can be seen that the vertical cam block 20 is provided with a plurality of vertically staggered apertures 21 wherein the base 22 of the vertical cam block is configured and dimensioned to be received in a selected one of the plurality of channel tracks 103 in the generally planar support surface 101. By selectively positioning the pin member 32 and a selective one of the apertures 21 of the vertical cam block the height of the locking cam member 30 may be varied relative to a workpiece 200 in a well recognized fashion.

In the preferred mode of operation of the present invention, the double locking cam member arrangement is preferable to a single locking cam arrangement shown in FIG. 3, due to the fact that the oppositely facing arcuate surfaces 31' and 30' provide a much more secure frictional engagement of the workpiece 100 against any abutting surface, be it the generally planar work surface 101 of FIG. 1 or an abutment plate member 15 of FIG. 4.

In the alternate version of the preferred embodiment depicted in FIG. 4 the pin member 32 is dimensioned to be received in the plurality of apertures 102 in the generally planar work surface 100. In this embodiment, an abutment plate 15 is positioned on the generally planar work surface 100, the workpiece 200 is placed in contact with the abutment plate 15, and a single or double locking cam arrangement is positioned such that the arcuate surface 31' and/or 30' may be brought into frictional engagement with the workpiece 200 to engage the workpiece relative to the generally planar support surface 100.

At this juncture, it should be noted that the lateral translating ability of the pin member 32 relative to the locking cam member 30, allows the orientation of the cam member 30 to be changed from a left-hand to a right-hand orientation, relative to either the vertical cam block 20 or the apertures 102 on the generally planar work support surface, subject to the desires of the user.

In addition, the upwardly raised projections maintain the pin member 32 in contact with the cam member 30 so that the two components do not become separated during or subsequent to use.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A workpiece clamping apparatus for securing a workpiece relative to a planar support surface; wherein, the workpiece clamping apparatus comprises:

a cam having an arcuate exterior surface; a central aperture extending through the cam along a longitudinal axis; and an integrally formed tang projecting into said central aperture;

pin means slidably disposed within said central aperture for mounting said cam along said longitudinal axis at the opposite ends of said pin means; and, means for attaching the workpiece clamping apparatus to said planar support surface, wherein the pin means is provided with a groove dimensioned to receive said tang in the central aperture of the cam; and, the groove is further provided with stop means to prevent the pin means from being separated from said cam.

2. The workpiece clamping apparatus as in claim 1, wherein the stop means are formed integrally with and disposed at locations proximate to the opposite ends of said pin means.

3. The workpiece clamping apparatus for securing a workpiece relative to a planar support surface; wherein, the workpiece clamping apparatus comprises:

a cam having; a contoured exterior surface; a generally centrally disposed aperture extending through the cam along a longitudinal axis;

a pin member dimensioned to be received in a reciprocal manner in said aperture; wherein said cam is provided with an integrally formed downwardly depending tang; and, said pin member is provided with a recess dimensioned to captively receive said tang; and means for attaching the workpiece clamping apparatus to said planar support member, wherein, the lateral translation of the cam from one end of the pin member to the other end of the pin member will change the camming orientation of the exterior surface of the cam from a right hand cam to a left hand cam.

* * * * *